(12) United States Patent
Croak et al.

(10) Patent No.: US 7,881,294 B1
(45) Date of Patent: Feb. 1, 2011

(54) METHOD AND APPARATUS FOR ENABLING NETWORK BASED MEDIA MANIPULATION

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 842 days.

(21) Appl. No.: 11/017,973

(22) Filed: Dec. 21, 2004

(51) Int. Cl.
*H04L 12/56* (2006.01)
*H04L 12/12* (2006.01)
*H04L 12/26* (2006.01)

(52) U.S. Cl. ...................... 370/392; 370/465

(58) Field of Classification Search ................. 370/465, 370/466, 467, 471, 252–256, 398, 392, 401
See application file for complete search history.

(56) References Cited

U.S. PATENT DOCUMENTS

| | | | |
|---|---|---|---|
| 6,208,626 B1 * | 3/2001 | Brewer | 370/324 |
| 6,603,774 B1 * | 8/2003 | Knappe et al. | 370/466 |
| 6,650,901 B1 * | 11/2003 | Schuster et al. | 455/456.1 |
| 6,744,759 B1 * | 6/2004 | Sidhu et al. | 370/356 |
| 6,885,658 B1 * | 4/2005 | Ress et al. | 370/352 |
| 7,002,992 B1 * | 2/2006 | Shaffer et al. | 370/468 |
| 7,227,865 B2 * | 6/2007 | Shaheen et al. | 370/395.21 |
| 7,260,060 B1 * | 8/2007 | Abaye et al. | 370/230 |
| 2002/0061008 A1 * | 5/2002 | Lysejko et al. | 370/351 |
| 2004/0032860 A1 * | 2/2004 | Mundra et al. | 370/352 |
| 2004/0037317 A1 * | 2/2004 | Zalitzky et al. | 370/466 |
| 2004/0184446 A1 * | 9/2004 | Havens | 370/352 |
| 2005/0041578 A1 * | 2/2005 | Huotari et al. | 370/229 |
| 2005/0220139 A1 * | 10/2005 | Aholainen | 370/466 |
| 2006/0031559 A1 * | 2/2006 | Sorokopud et al. | 709/232 |
| 2007/0110043 A1 * | 5/2007 | Girard | 370/352 |
| 2008/0059647 A1 * | 3/2008 | Jabri et al. | 709/231 |

OTHER PUBLICATIONS

J. Rosenberg et al, Indicating User Agent Capabilities in the Session Initiation Protocol (SIP), RFC 3840, Aug. 2004, pp. 1-36.*

* cited by examiner

*Primary Examiner*—Chi H Pham
*Assistant Examiner*—Ahmed Elallam

(57) ABSTRACT

The present invention enables the network to provide enhanced processing of the media stream before and/or during the call establishment. In one embodiment, the network can use the Session Description Header information to provide service support such as mid call Dual Tone Multiple Frequency (DTMF) detection, transcoding, and media conversion within the network instead of between two intelligent endpoint devices.

18 Claims, 4 Drawing Sheets

METHOD AND APPARATUS FOR ENABLING NETWORK BASED MEDIA MANIPULATION

The present invention relates generally to communication networks and, more particularly, to a method and apparatus for enabling network based media manipulation in a packet-switched network, e.g., a Voice over Internet Protocol (VoIP) network.

BACKGROUND OF THE INVENTION

Media manipulation in Session Initiation Protocol (SIP) based network services is often assumed to occur in the intelligent endpoint devices accessing the network. The network is often viewed as a basic Internet Protocol packet transport provider with little intelligence to handle media related processing. Media manipulation is typically assumed to take place only between the two intelligent endpoint devices and the network is assumed to have no such support.

Therefore, a need exists for a method and apparatus for enabling network based media manipulation in a packet-switched network, e.g., a Voice over Internet Protocol (VoIP) network.

SUMMARY OF THE INVENTION

In one embodiment, the present invention enables a Call Control Element along with an Application Server in the network to process the Session Description Header information in the SIP signaling stream before a communication path is established. Broadly defined, the CCE is the network element that performs call control functions to setup a call and the AS is a network element that comprises the data as well as applications that the CCE needs in order to setup a call.

In one embodiment, the present invention enables the network to provide enhanced processing of the media stream before and/or during the call establishment. The network can use the Session Description Header information to provide service support such as mid call Dual Tone Multiple Frequency (DTMF) detection, transcoding, and media conversion within the network instead of between two intelligent endpoint devices. DTMF detection involves detecting a DTMF signal by the network and translates the signal into an equivalent SIP message or an invocation of network service features. Transcoding and media conversion involve converting media from one codec format to another codec format.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
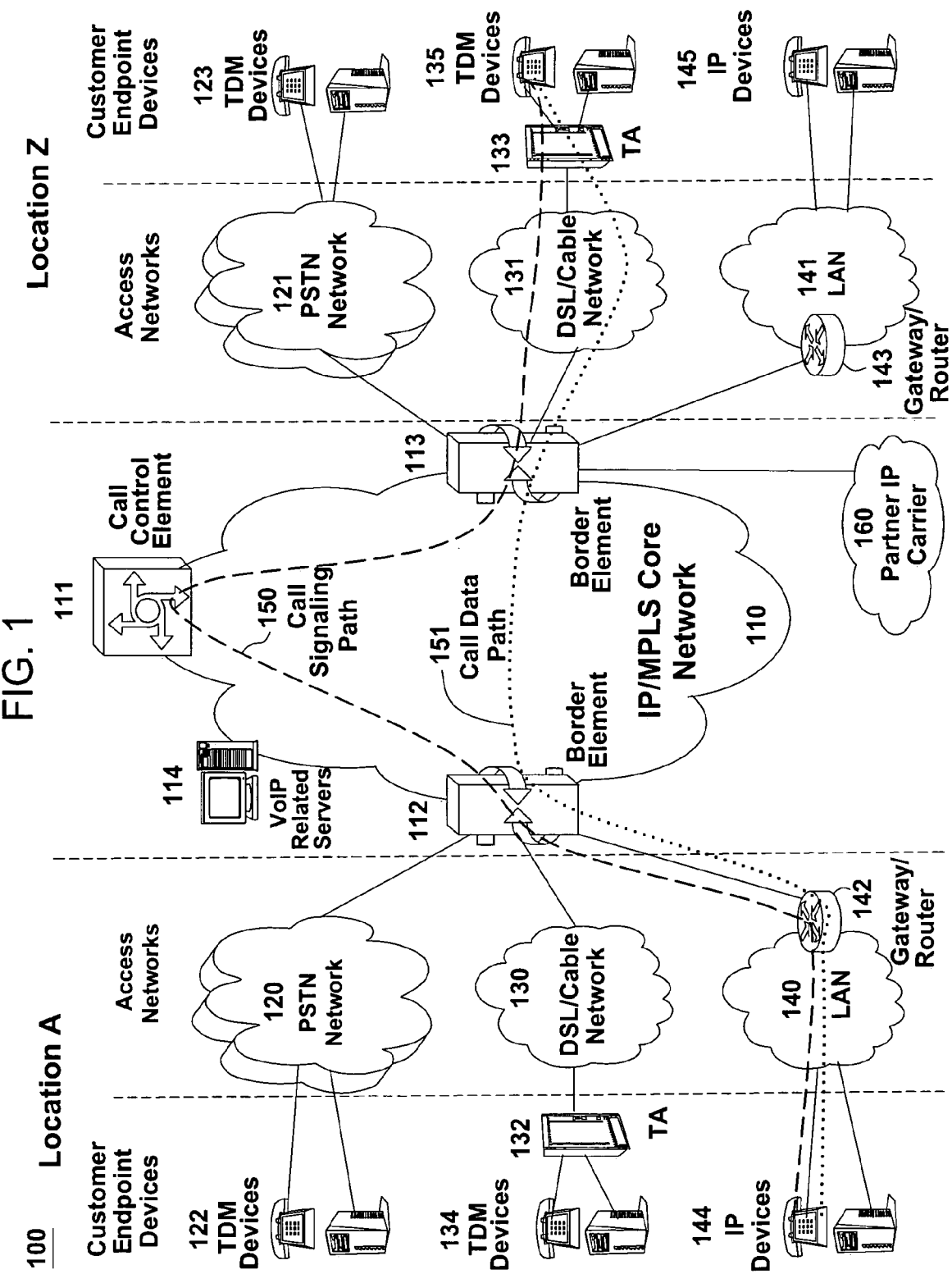
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message; such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Media manipulation in Session Initiation Protocol (SIP) based network services is often assumed to occur in the intelligent endpoint devices accessing the network. The network is often viewed as a basic Internet Protocol packet transport provider with little intelligence to handle media related processing. The Session Description Header (SDH) of a SIP message contains media handling related information for a call being setup including the type of media and the media format supported. For instance, a SDH may contain information that an endpoint device is setting up an audio call using the International Telecommunications Union (ITU) based G.711 codec standard. A codec is used to convert an analog voice signal to digitally encoded version and the ITU G.711 standard supports 64 kbps audio encoding. Once a call is established between two intelligent endpoint devices, the information contained in the Session Description Header can be used to provide intelligence about the media and ways of manipulating it by these endpoint devices. For instance, with intelligent endpoint devices at both ends, the call that has been established using the G.711 codec can be changed to use the G.728 codec during the call to preserve bandwidth used between the two endpoints. This change is facilitated by sending a SIP signaling message between two endpoint devices with the corresponding Session Description Header information regarding the use of a different audio codec. The ITU based G.728 standard supports 16 kbps audio encoding. This type of media manipulation is typically assumed to take place only between the two intelligent endpoint devices and the network is assumed to have no such support.

To address this need, the present invention enables the Call Control Element along with an Application Server in the network to process the Session Description Header information in the SIP signaling stream before a communication path is established. Broadly defined, the CCE is the network element that performs call control functions to setup a call and the AS is a network element that comprises the data as well as applications that the CCE needs in order to setup a call. The present invention enables the network to provide enhanced processing of the media stream before and/or during the call establishment. The network can use the Session Description Header information to provide service support such as mid call Dual Tone Multiple Frequency (DTMF) detection, transcoding, and media conversion within the network instead of between two intelligent endpoint devices. DTMF detection involves detecting a DTMF signal by the network and translates the signal into an equivalent SIP message or an invocation of network service features. Transcoding and media conversion involve converting media from one codec format to another codec format.

Figure 2:
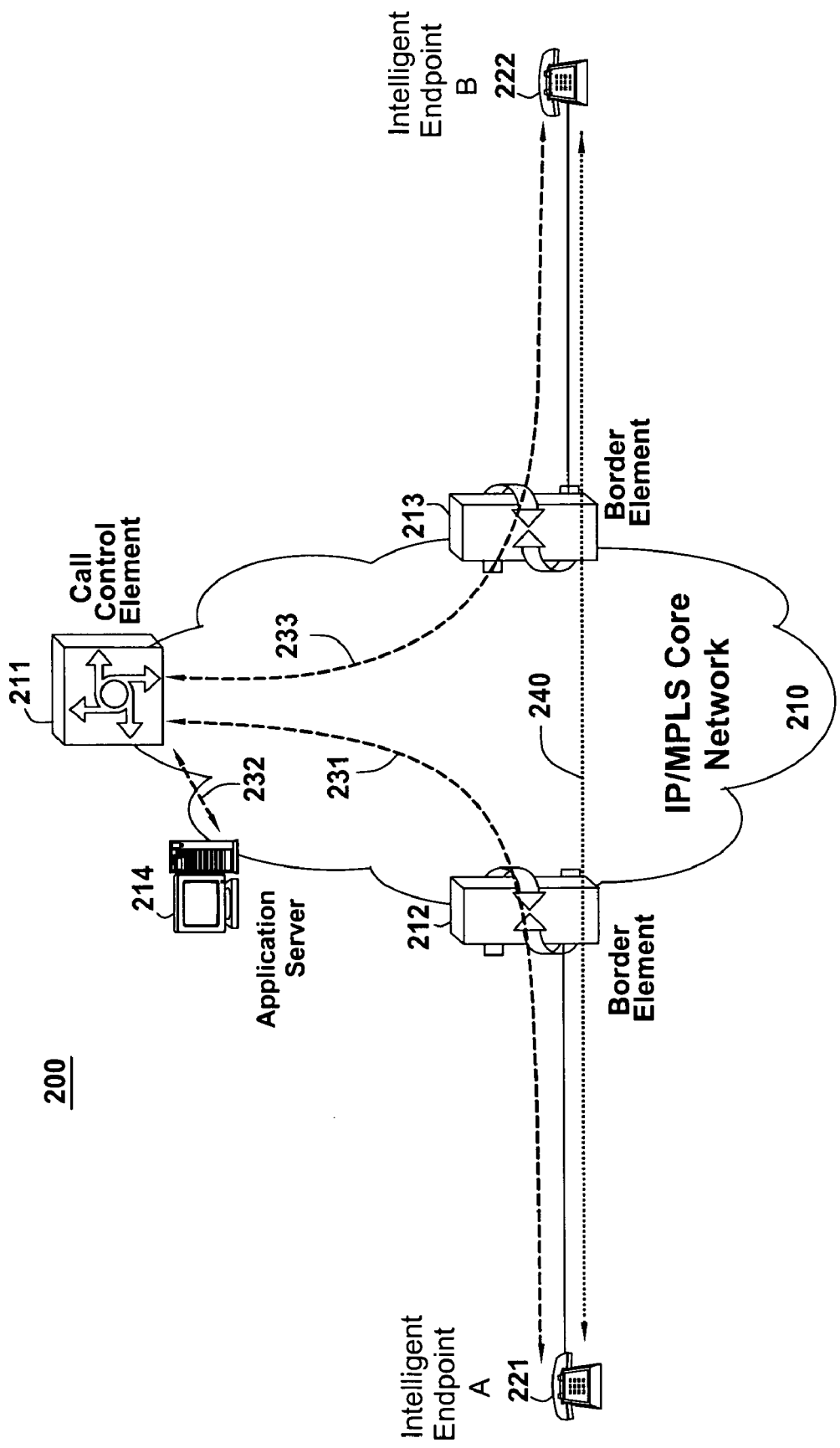
FIG. 2 illustrates an example of network based media manipulation in a VoIP network of the present invention.

FIG. 2 illustrates an example of network based media manipulation in a VoIP network. Intelligent endpoint device A, 221, is setting up a call to intelligent endpoint device B, 222. Device A includes information regarding media handling capabilities of device A in the Session Description Header carried within the SIP call setup message 231. CCE 211 receives the call setup message originated by device A and captures the information in the Session Description Header regarding media handling capabilities of device A. CCE 211 then sends, flow 232, the captured information to Application Server 214 to be stored. Similarly, when device B sends a call acknowledgement message 233 back to device A, CCE 211 captures the information in the Session Description Header regarding media handling capabilities of device B. CCE 211 then sends, flow 232, the captured information to Application Server 214 to be stored. Once the call has been established, CCE 211 and AS 214 have the information regarding media handling capabilities of both devices A and B.

To illustrate, device A is communicating with device B using G.711 and the user of device A decides to modify the audio encoding to G.728 instead during the call to preserve bandwidth. Device A signals the change request to the network and CCE 211 responds with the request by signaling BE 212 and BE 213 to perform the change of transcoding from G.711 to G.728 on behalf of device A and B. CCE 211 has to communicate with AS 214 to verify the type of codecs, especially G.728, supported by device A and B and to retrieve the associated service logic needed to support the media manipulation request before signaling BE 212 and 213 to perform the transcoding modification. Once the transcoding change has been executed by BEs 212 and 213, the BE to BE segment of media path 240 uses G.728 audio encoding while the two BEs to endpoint device segments of media path 240 use G.711 audio encoding, with transcoding between the two encodings performed by BEs 212 and 213 at the edge of the network.

Figure 3:
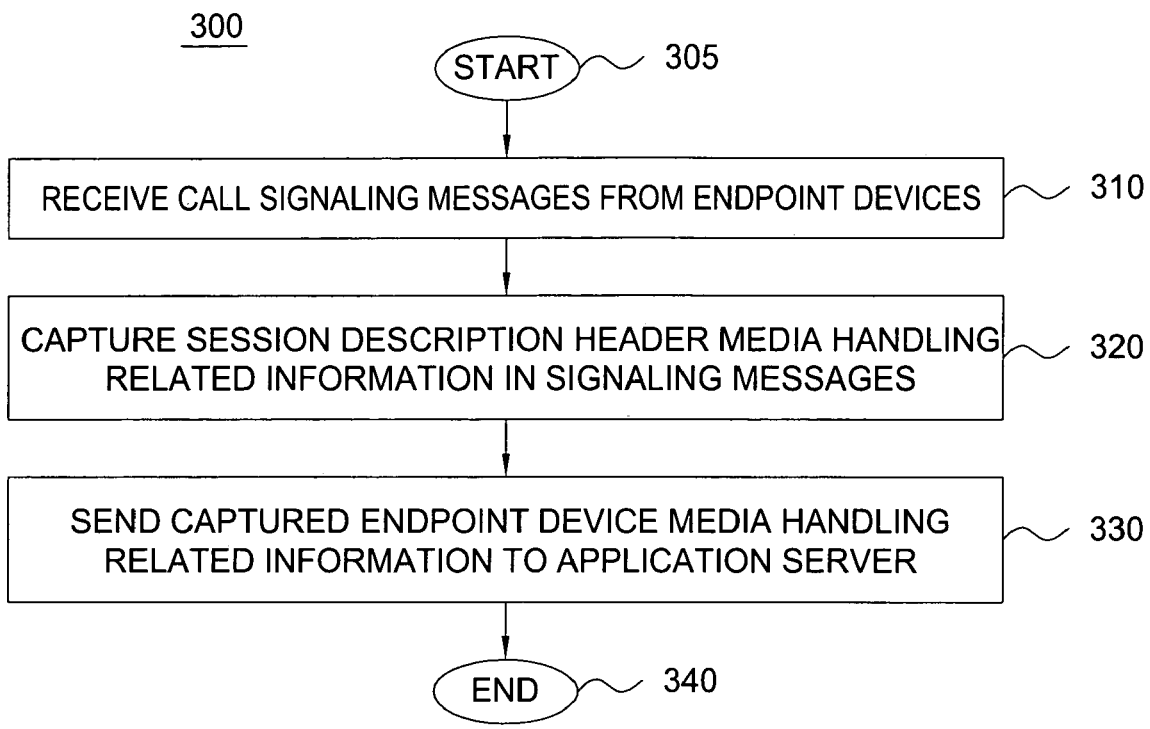
FIG. 3 illustrates a flowchart of a method for capturing Session Description Header information in a VoIP network of the present invention.

FIG. 3 illustrates a flowchart of a method for capturing Session Description Header information by the CCE in a VoIP network. Method 300 starts in step 305 and proceeds to step 310.

In step 310, the method receives SIP signaling messages from endpoint devices. In step 320, the method captures the media handling capabilities related information from the Session Description Header of the SIP signaling messages. In step 330, the method sends the captured information to the AS for storage and later use. The method ends in step 340.

Figure 4:
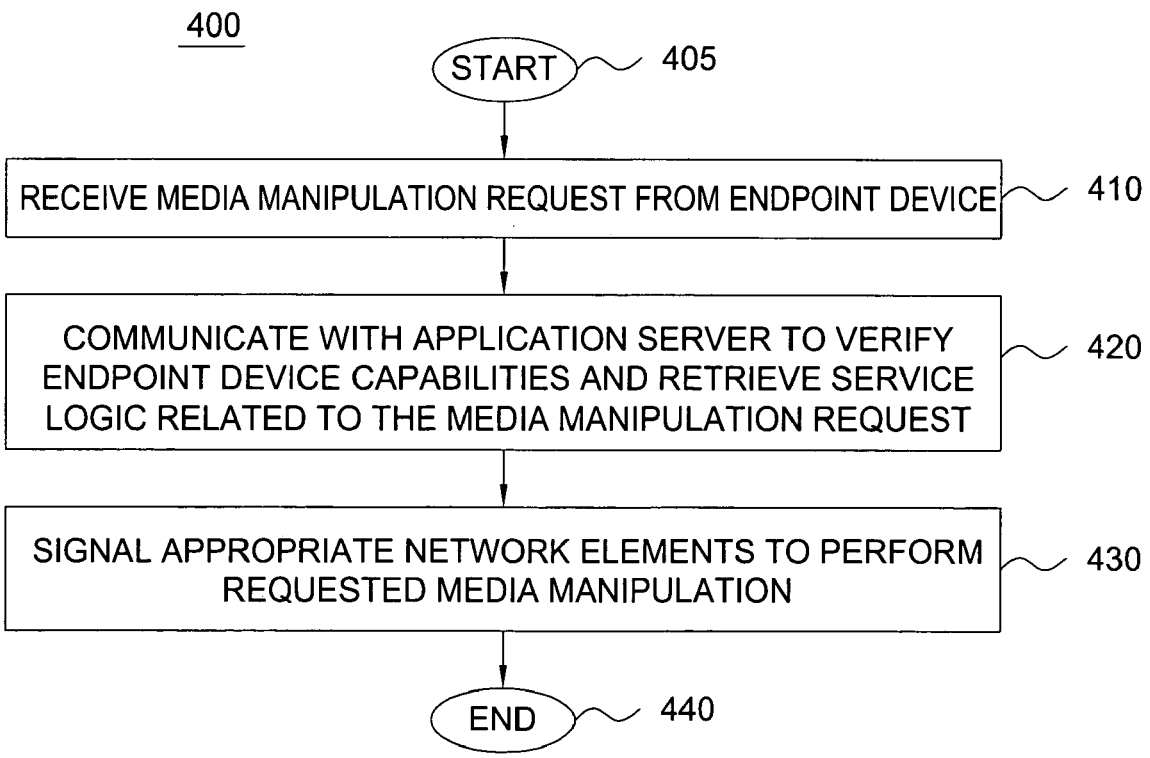
FIG. 4 illustrates a flowchart of a method for enabling network based media manipulation in a VoIP network of the present invention.

FIG. 4 illustrates a flowchart of a method for enabling network based media manipulation in a VoIP network. Method 400 starts in step 405 and proceeds to step 410.

In step 410, the method receives a media manipulation request from an endpoint device. In step 420, the method communicates with the AS to verify endpoint device media handling capabilities and retrieve service logic associated with the media manipulation request. In step 430, the method signals the appropriate network elements, such as BEs, to carry out the requested media manipulation request. The method ends in step 440.

It should be noted that although the present invention is described in the context of a Session Description Header of the SIP signaling messages, the present invention is not so limited. Specifically, session description header in accordance with other communication protocols can be adapted for use with the present invention.

Figure 5:
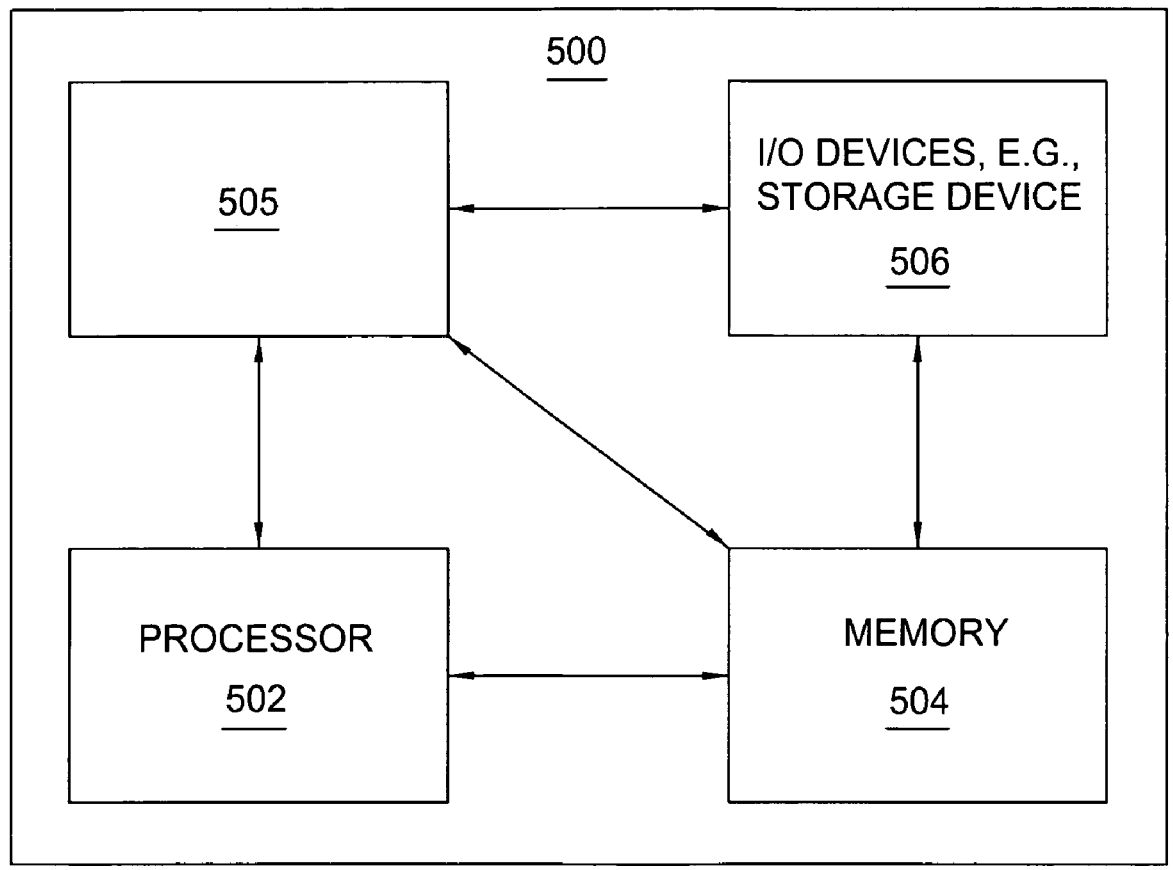
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a network based media manipulation module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present network based media manipulation module or process 505 can be loaded into memory 504 and executed by processor 502 to implement the functions as discussed above. As such, the present network based media manipulation process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling network based media manipulation in a communication network, comprising:
   receiving call setup signaling messages from a first endpoint device and a second endpoint device during a call setup of a call;
   capturing by a call control element media handling capability information of the first endpoint device from a first session description header of the call setup signaling messages; and
   capturing by the call control element media handling capability information of the second endpoint device from a second session description header of the call setup signaling messages, wherein the media handling capability information comprises a codec standard.

2. The method of claim 1, wherein the communication network is a voice over internet protocol network.

3. The method of claim 1, wherein the call setup signaling messages are session initiation protocol based signaling messages.

4. The method of claim 1, further comprising:
   sending the media handling capability information to an application server for storage.

5. The method of claim 1, further comprising:
   receiving a media manipulation request from the first endpoint device during the call; and
   using a network element to service the media manipulation request.

6. The method of claim 5, wherein the using comprises:
   communicating with an application server to retrieve a service logic required to service the media manipulation request; and
   signaling the network element to perform the media manipulation request using the retrieved service logic.

7. The method of claim 6, wherein the network element comprises a border element.

8. A no-transitory computer-readable medium having stored thereon a plurality of computer executable instructions, the plurality of computer executable instructions including computer executable instructions which, when executed by a processor, cause the processor to perform a method for enabling network based media manipulation in a communication network, comprising:
   receiving call setup signaling messages from a first endpoint device and a second endpoint device during a call setup of a call;
   capturing by a call control element media handling capability information of the first endpoint device from a first session description header of the call setup signaling messages; and
   capturing by a call control element media handling capability information of the second endpoint device from a second session description header of the call setup signaling messages, wherein the media handling capability information comprises a codec standard.

9. The computer-readable medium of claim 8, wherein the communication network is a voice over internet protocol network.

10. The computer-readable medium of claim 8, wherein the call setup signaling messages are session initiation protocol based signaling messages.

11. The computer-readable medium of claim 8, further comprising:
    sending the media handling capability information to an application server for storage.

12. The computer-readable medium of claim 8, further comprising:
    receiving a media manipulation request from one of said first and second the first endpoint device during the call; and
    using a network element to service the media manipulation request.

13. The computer-readable medium of claim 12, wherein the using comprises:
   communicating with an application server to retrieve a service logic required to service the media manipulation request; and
   signaling the network element to perform the media manipulation request using the retrieved service logic.

14. The computer-readable medium of claim 13, wherein the network element comprises a border element.

15. A system for enabling network based media manipulation in a communication network, comprising:
   a call control element configured to:
      receive call setup signaling messages from a first endpoint device and a second endpoint device during a call setup of a call;
      capture media handling capability information of the first endpoint device from a first session description header of said the call setup signaling messages; and
      capture media handling capability information of the second endpoint device from a second session description header of the call setup signaling messages, wherein the media handling capability information comprises a codec standard.

16. The system of claim 15, wherein the communication network is a voice over Internet protocol network.

17. The system of claim 15, wherein the call setup signaling messages are session initiation protocol based signaling messages.

18. The system of claim 15, further comprising:
   means for receiving a media manipulation request from the first endpoint device during the call; and
   means for using a network element to service the media manipulation request.

* * * * *